No. 609,247. Patented Aug. 16, 1898.
N. TESLA.
ELECTRIC CIRCUIT CONTROLLER.
(Application filed Mar. 12, 1898.)
(No Model.)

Witnesses:
Raphael Netter
Benjamin Miller

Inventor
Nikola Tesla
by
Ken. Curtis Page Atty's.

UNITED STATES PATENT OFFICE.

NIKOLA TESLA, OF NEW YORK, N. Y.

ELECTRIC-CIRCUIT CONTROLLER.

SPECIFICATION forming part of Letters Patent No. 609,247, dated August 16, 1898.

Application filed March 12, 1898. Serial No. 673,558. (No model.)

*To all whom it may concern:*

Be it known that I, NIKOLA TESLA, of the borough of Manhattan, in the city, county, and State of New York, have invented certain new and useful Improvements in Circuit-Controllers, of which the following is a specification, reference being had to the drawings accompanying and forming a part of the same.

In an application filed by me on June 3, 1897, Serial No. 639,227, I have shown and described a device for making and breaking an electric circuit comprising a rotary receptacle containing a conducting fluid and a terminal mounted within but independently of the receptacle and caused by the rotation of the latter to make and break electrical contact with the fluid.

The invention on which my present application is based is an improvement in devices of this particular class, and has primarily as its object the production of a circuit-controller in which an independently-mounted terminal operated in a similar manner by a rotating body of conducting fluid may be inclosed within a gas-tight receptacle.

The invention comprises features of construction by which this object is practically secured and certain improvements applicable to this and other analogous devices, as will be more fully hereinafter set forth.

Figure 1:
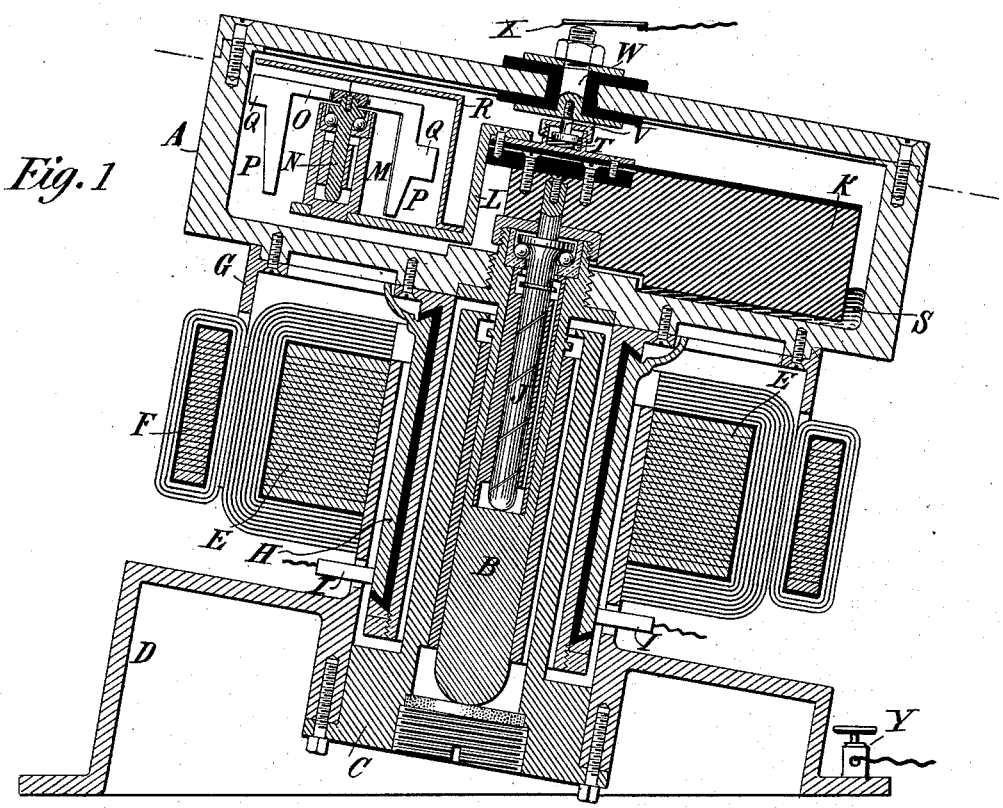
Figure 2:
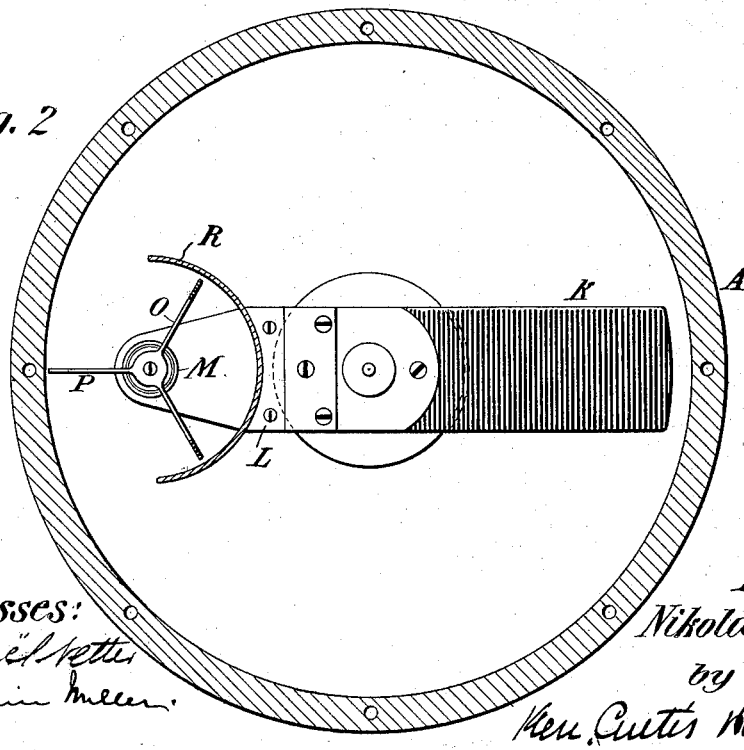

In the accompanying drawings, Figure 1 is a vertical central section of the improved circuit-controller, and Fig. 2 a top plan view of the same with the top or cover of the receptacle removed.

The operative portions of the circuit-controlling mechanism are contained in a closed cylindrical receptacle A, of iron or steel, mounted on a spindle B in a suitable socket or support C to permit it to be freely and rapidly rotated. The socket C is secured to or forms a part of a base or stand D.

As a means of producing the proper rotation of the receptacle A, I have shown a field-magnet E, mounted on or secured to the base D, and an armature F, supported by a bracket G from the under side of the receptacle A. The same bracket also carries a series of commutator-segments H, upon which bear brushes I, these parts being arranged to constitute an electromagnetic motor with stationary field and rotating armature. It may be stated that any other suitable means may be employed to rotate the receptacle and the fluid.

In the spindle B and concentric with its axis is a spindle J in bearings specially constructed to reduce friction in order that the spindle J may be as little as possible influenced by the rotation of the main spindle and receptacle carried thereby. A suitable provision is made to oppose or prevent the rotation of the spindle J during the rotation of the receptacle. I have devised for this purpose the following:

The spindle B is held by its bearings at an angle to the vertical, and a weight K is secured eccentrically to the spindle J and tends to hold the said spindle always in one position. The inclination of the axes of rotation necessary for this result may be substantially that shown and should not be materially greater, for the reason that it is especially advantageous to preserve the spindles and bearings as nearly as practicable vertical on account of lesser friction and easier lubrication.

Attached to the spindle J or weight K is an insulated bracket L, carrying a standard or socket M, in which is mounted on antifriction-bearings a spindle N. Secured to this latter is a plate with radial arms O, from which depend vanes or blades P, with projections Q extending radially therefrom. A shield or screen R incloses the vanes, except on the side adjacent to the inner periphery of the receptacle A.

A small quantity of a conducting fluid S is placed in the receptacle, and in order to secure a good electrical connection between the vanes P and a terminal on the outside of the receptacle a small mercury-cup T, in metallic contact with the vanes through the bracket L and socket M, is secured to the weight K. A metal stud V, set in an insulated bolt W, projects into the cup T through a packed opening in its cover. One terminal of the circuit-controlling mechanism will thus be any part of the metal receptacle and the other the insulated bolt W. The apparatus may be connected up in circuit by connecting the wires of the circuit to a brush X, bearing on the bolt W, and to a binding-post Y in contact with the base D.

To operate the apparatus, the receptacle is set in rotation, and as its speed increases the mercury or other conducting fluid which it contains is carried by centrifugal force up the sides of the inner wall, over which it spreads in a layer. When this layer rises sufficiently to encounter the projections Q on the blades or vanes P, the latter are set in rapid rotation, and the electrical connection between the terminal of the apparatus is thereby made and broken, it may be, with very great rapidity.

The projections Q are preferably placed at different heights on the vanes P, so as to secure greater certainty of good contact with the mercury film when in rapid rotation.

As to the forms of the circuit-controller heretofore referred to and upon which my present invention is an improvement the blades or vanes P may be regarded in a broad sense as typical of any device—such, for example, as a stelliform disk—which will be set and maintained in rotation by that of the receptacle. So, also, having regard to the feature of my invention which provides for maintaining such a device in operation in a receptacle which may be hermetically sealed, so as to be capable of containing an inert medium under pressure in which the makes and breaks occur and which medium is practically essential to a long-continued and economical operation of the device, I may employ other and widely-different means for opposing or preventing the rotation of the part carrying such vanes in the direction of the rotation of the receptacle and fluid.

Having now described my invention, what I claim is—

1. A circuit-controller comprising, in combination, a closed receptacle containing a fluid, means for rotating the receptacle, a support mounted within the receptacle, means for opposing or preventing its movement in the direction of rotation of the receptacle, and a conductor carried by said support and adapted to make and break electric connection with the receptacle through the fluid, as set forth.

2. A circuit-controller comprising, in combination, a terminal capable of rotation and formed or provided with radiating contacts, a closed receptacle containing a fluid which constitutes the opposite terminal, means for rotating the receptacle, a support therein for the rotating terminal, and means for opposing or preventing the rotation of the support in the direction of the rotation of the receptacle, as set forth.

3. In a circuit-controller, the combination with a receptacle capable of rotation about an axis inclined to the vertical and containing a fluid which constitutes one terminal, a second terminal mounted within the receptacle, on a support capable of free rotation relatively to the receptacle, and a weight eccentric to the axis of rotation of the support for said terminal for opposing or preventing its movement in the direction of the rotation of the said receptacle, as set forth.

4. The combination with a receptacle mounted to revolve about an axis inclined to the vertical, of a spindle within the receptacle and concentric with its axis, a weight eccentric to the spindle, and a terminal carried by the said spindle, and adapted to be rotated by a body of conducting fluid contained in the receptacle when the latter is rotated, as set forth.

5. The combination with a receptacle mounted to rotate about an axis inclined to the vertical, a spindle within the receptacle and concentric with its axis, a weighted arm attached to said spindle, a bracket or arm also secured to said spindle, a rotary terminal with radiating contact arms or vanes mounted on said bracket in position to be rotated by a body of conducting fluid contained in said receptacle when said fluid is displaced by centrifugal action, as set forth.

NIKOLA TESLA.

Witnesses:
M. LAWSON DYER,
G. W. MARTLING.